United States Patent

Thibodeaux et al.

Patent Number: 6,028,523
Date of Patent: Feb. 22, 2000

[54] INTEGRAL GROUND PIN FOR SEALED COMPRESSOR

[75] Inventors: Lamar W. Thibodeaux; Scott Westberg, both of Arkadelphia, Ak.

[73] Assignee: Carrier Corporation, Farmington, Conn.

[21] Appl. No.: 09/105,135

[22] Filed: Jun. 25, 1998

[51] Int. Cl.⁷ .................................................. G08B 21/00
[52] U.S. Cl. ............................ 340/649; 340/585; 62/498
[58] Field of Search ................................... 340/649, 656, 340/648, 585; 62/498; 439/92, 95, 106

[56] References Cited

U.S. PATENT DOCUMENTS

| | | | |
|---|---|---|---|
| 3,290,668 | 12/1966 | Perretta | 340/649 |
| 3,708,721 | 1/1973 | Marcade et al. | 340/649 |
| 4,265,603 | 5/1981 | Chiyoda et al. | 340/585 |
| 4,318,578 | 3/1982 | Ericson et al. | 339/14 P |
| 4,642,554 | 2/1987 | Aucoin | 340/649 |
| 4,686,324 | 8/1987 | Debaisieux et al. | 174/17.05 |
| 4,800,732 | 1/1989 | Newton | 62/236 |

*Primary Examiner*—Jeffery A. Hofsass
*Assistant Examiner*—John Tweel, Jr.
*Attorney, Agent, or Firm*—Howard & Howard

[57] ABSTRACT

An integral ground connection is provided in a sealed compressor housing. The ground connection includes a pin which receives a connection from a power supply to provide a ground for the power supply at the compressor. The pin is electrically communicated to the compressor housing. A visual indication is made internal to the compressor of which of the four connections is associated with the ground and which of the other three are supplying the three phase power.

7 Claims, 2 Drawing Sheets

INTEGRAL GROUND PIN FOR SEALED COMPRESSOR

BACKGROUND OF THE INVENTION

This invention relates to an improvement in the way electrical power is supplied and grounded to a sealed compressor.

Sealed compressors are utilized in many refrigerant compression applications. Typically, a compressor pump unit and an electrical motor are sealed within a canister body. Refrigerant is directed into the canister body and can flow within the canister body to the pump unit.

Since the refrigerant is allowed to flow within the canister, the canister must be provided with fluid type seals at any openings. One opening that provides some challenge to sealing is the opening for the power supply.

The electrical motors associated with these compressors are often three-phase electrical power motors. In a three-phase motor, three distinct power supply lines travel to the compressor.

In the prior art, a separate ground line is attached to the compressor housing, and to the connector. The separate ground wire requires some undesirable additional assembly. Further, the extra wire is susceptible to being dislodged, which is undesirable.

SUMMARY OF THE INVENTION

In a disclosed embodiment of this invention, an electrical ground is provided integral to the electrical connector itself. In particular, four pins are provided within the electrical connector. Three of the pins are associated with the three phase power supply for the three phase motor. The fourth pin is a ground pin. The ground pin is in electrical communication with a steel plate, which receives all four of the pins. The other three pins are insulated from the steel plate. The steel plate is welded to the compressor canister body. Thus, there is a direct connection from the ground pin to the steel plate, and then to the compressor body, such that an adequate ground is provided.

On the other hand, there is no separate wire that could become dislodged. Further, the final connection of the ground occurs automatically when the other electrical connections are made. Thus, the assembly is simplified.

In a further feature of this invention, the inner ends of the four pins are distinct from the ground pin. That is, some indication is provided to the assembler of which of the four pins is the ground such that the assembler is able to easily assemble the wires between a motor control and the power supply.

In a preferred embodiment, the terminal ground pin is made shorter than the other pins. Thus, the assembler has a clear visual indication of which of the four pins is ground.

These and other features of the present invention can be best understood from the following specification and drawings, the following of which is a brief description.

DETAILED DESCRIPTION OF A PREFERRED EMBODIMENT

Figure 1:
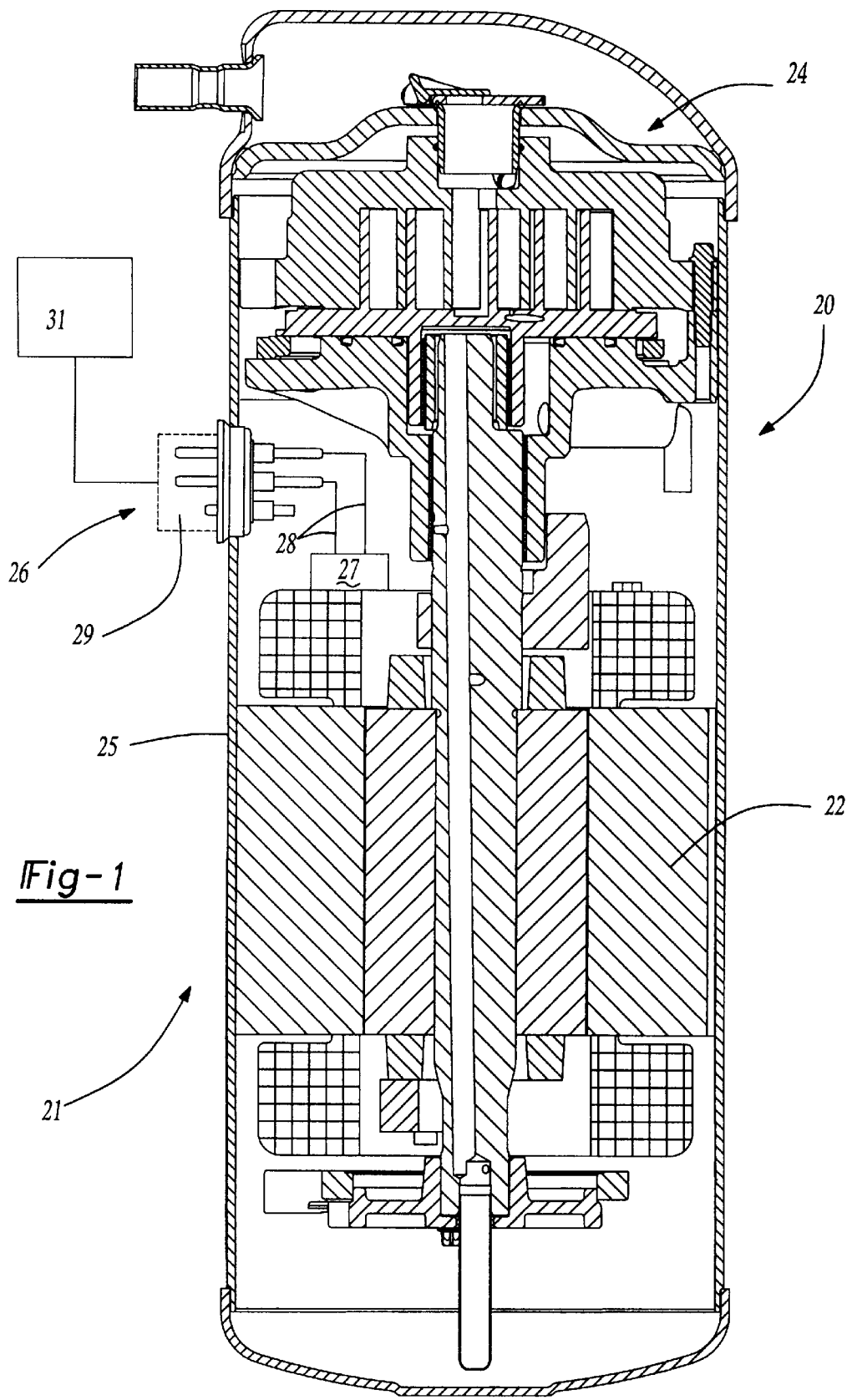
FIG. 1 shows a scroll compressor incorporating the present invention.

FIG. 1 shows a sealed compressor 20 having a canister 21 enclosing a motor 22 and a pump unit 24. The pump unit is preferably a scroll compressor in this application; however, this invention extends to other types of sealed compressors.

An electrical connection 26 is shown received within an outer shell wall 25 of canister 21. The electrical connection is shown schematically receiving a power supply 29, shown in phantom, and extending to a power supply 31. The power supply 31 supplies three phase power to the motor 22. An appropriate motor control 27 is also included within canister 20, and wires 28 travel from connection 26 to control.

Figure 2:
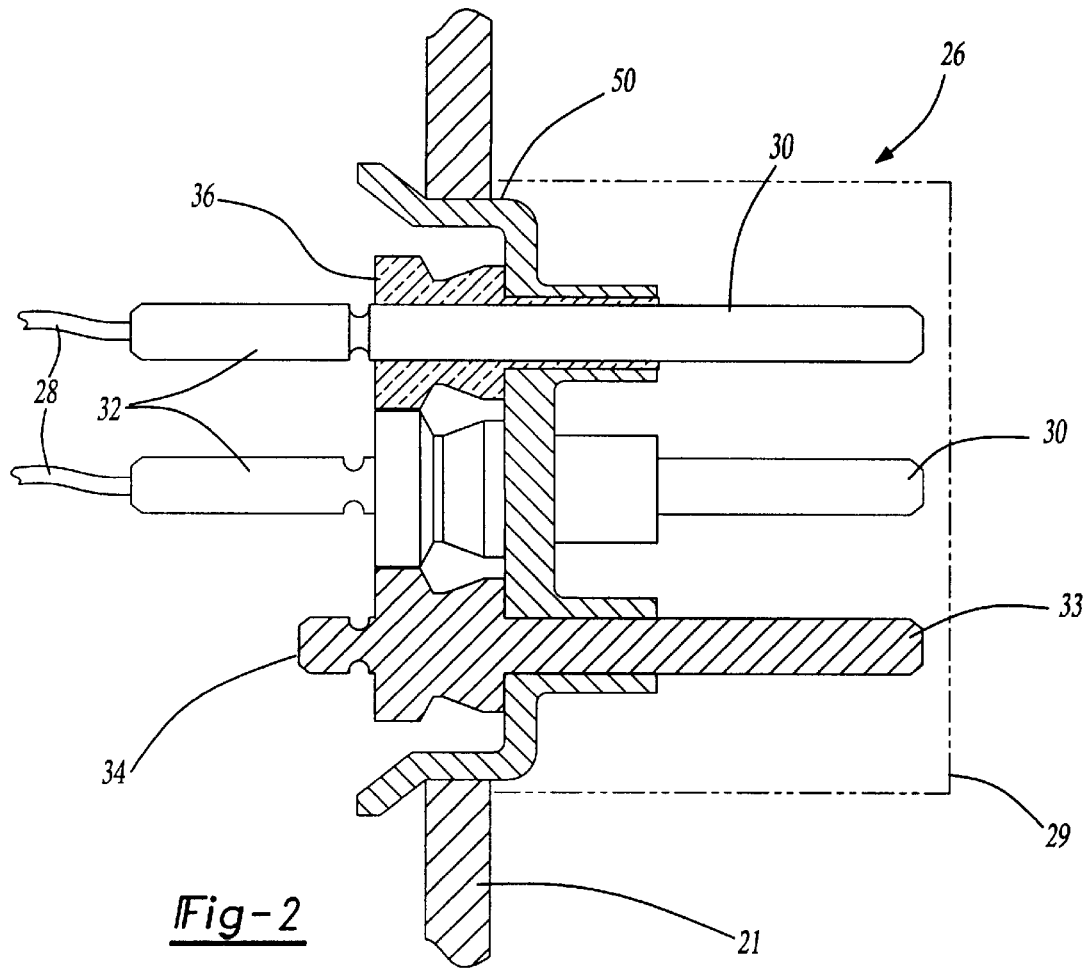
FIG. 2 is an enlarged view of the electrical connection portion of this invention.
Figure 3:
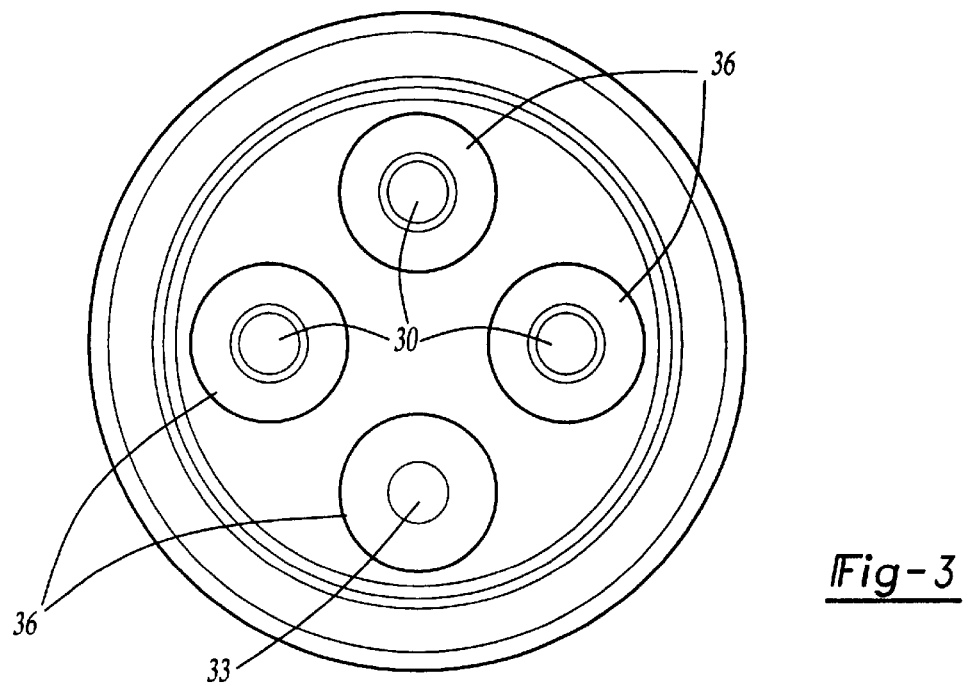
FIG. 3 is a cross-sectional view perpendicular to the view shown in FIG. 2.

As shown within FIG. 2, connection 26 includes a steel ring 27 welded into the sidewall 21. Within ring 27, a plurality of pins 30 extend to an inner end 32. Inner ends 32 are connected with wires 28 which extend to motor control 27.

A terminal pin for supplying a ground includes an inner end 34. Notably, inner end 34 is shorter than the inner ends 32. When an assembler is attaching the wires 28 internal to the compressor, the assembler will have an easy visual indication of which of the pin is grounded. Thus, the assembler will not accidentally attach power lines to ground pin 33.

Insulators, which may be ceramic insulators 36, surround the pin 30, but not the pin 33. Thus, the pins 30 are isolated from the ring 50, while the pin 33 is not isolated from the ring 27. Ring 27 is welded to canister 21, and the housing joint completes an electrical connection between the pin 33, to the canister 21.

When the connection 29 is attached, an appropriate ground connection is received by pin 33, such that an electrical ground and all three power supplies are connected to and from the compressor.

The present invention simplifies the attachment of a ground pin to a sealed compressor by making the connection integrally when the electrical connections are first made. By utilizing the pin received within the ring which supplies the other power, the invention eliminates the need for any separate ground member. Further, by providing an assembler with an easy indication of which of the pins is ground, the assembly is also simplified.

Although a preferred embodiment has been disclosed, a worker of ordinary skill in the art would recognize that certain modifications come within the scope of this invention. For that reason, the following claims should be studied to determine the true scope and content of this invention.

What is claimed is:

1. A compressor comprising:
   a sealed compressor housing;
   an electrical motor to be driven to rotate upon receiving three phase power supply;
   a pump unit including a shaft driven by said electrical motor; and
   a power supply connection for supplying three phase power into said compressor, said power supply connection including three terminal power connections to be connected to a power supply to supply three phases of power, and a fourth terminal connection to be connected to a ground in said electrical connection, said fourth terminal connection being integrally grounded to said compressor housing, said ground connection providing a visual indication internal to said housing of which of said four terminals is said ground connection.

2. A compressor as recited in claim 1, wherein said electrical connection is received in a separate housing member, said separate housing member being welded to said compressor housing, and said ground connection being electrically connected to said separate housing such that when said separate housing is welded to said compressor housing, a ground connection is made.

3. A compressor as recited in claim 1, wherein each of said connections are pins extending into said sealed compressor housing, and said ground connection extending into said sealed compressor housing for a different distance than said three power connections.

4. A compressor as recited in claim 3, wherein said ground connection extends for a shorter distance.

5. A compressor as recited in claim 1, wherein said power supply connections are pins which are received in sockets in a power supply.

6. A compressor as recited in claim 5, wherein said ground connection is also a pin extending into a socket in said electrical connection.

7. A compressor comprising:

a sealed compressor housing;

an electrical motor to be driven to rotate upon receiving three phase power supply;

a pump unit including a shaft driven by said electrical motor;

a power supply connection for supplying three phase power into said compressor, said power supply connection including three terminal power connections to be connected to a power supply to supply three phases of power, and a fourth terminal connection to be connected to a ground in said electrical connection, said fourth terminal connection being integrally grounded to said compressor housing, said three terminal power connections and said fourth terminal connection all being received within a separate housing member, said fourth terminal connection being electrical communication with said fourth separate housing member, and said three terminal power connections being insulated from said separate housing member, said separate housing member being welded to said compressor housing, such that electrical communications extends from said fourth terminal connection, through said separate housing member and to said compressor housing; and each of said three power connections and said fourth terminal connection being pins extending into said sealed compressor housing, said ground connection extending into said housing for a different distance than said three power connections to provide an indication of which of said four connections is said ground connection.

* * * * *